(12) United States Patent
Callender et al.

(10) Patent No.: US 11,676,591 B1
(45) Date of Patent: Jun. 13, 2023

(54) SMART COMPUTING DEVICE IMPLEMENTING ARTIFICIAL INTELLIGENCE ELECTRONIC ASSISTANT

(71) Applicant: T-MOBILE INNOVATIONS LLC, Overland Park, KS (US)

(72) Inventors: Christopher Callender, Overland Park, KS (US); Brian Kuntz, Paola, KS (US); Lyle W. Paczkowski, Mission Hills, KS (US); Michael D. Svoren, Jr., Overland Park, KS (US)

(73) Assignee: T-MOBITE INNOVATIONS LLC, Overland Park, KS (US)

( * ) Notice: Subject to any disclaimer, the term of this patent is extended or adjusted under 35 U.S.C. 154(b) by 181 days.

(21) Appl. No.: 17/100,681

(22) Filed: Nov. 20, 2020

(51) Int. Cl.
*G10L 15/00* (2013.01)
*G10L 15/22* (2006.01)
*G10L 15/02* (2006.01)
*H04L 67/53* (2022.01)

(52) U.S. Cl.
CPC .............. *G10L 15/22* (2013.01); *G10L 15/02* (2013.01); *H04L 67/53* (2022.05)

(58) Field of Classification Search
CPC ................................. G10L 15/22; G06F 3/167
See application file for complete search history.

(56) References Cited

U.S. PATENT DOCUMENTS

| | | |
|---|---|---|
| 9,572,184 B1 | 2/2017 | Erdogan |
| 9,900,171 B2 | 2/2018 | Guedalia et al. |
| 10,142,122 B1 | 11/2018 | Hill et al. |
| 10,212,207 B2 * | 2/2019 | Albisu ................ H04L 65/1059 |
| 10,223,751 B1 | 3/2019 | Hutchinson et al. |
| 10,397,013 B1 | 8/2019 | Hill et al. |
| 10,498,598 B1 | 12/2019 | Sanchez et al. |
| 10,531,360 B1 | 1/2020 | Govindassamy |

(Continued)

FOREIGN PATENT DOCUMENTS

| | | |
|---|---|---|
| TW | 202141317 A | 4/2020 |
| WO | 20180231197 A1 | 12/2018 |
| WO | 2022098423 A1 | 5/2022 |

OTHER PUBLICATIONS

"Restriction Requirement dated Jan. 13, 2022, U.S. Appl. No. 17/089,647, filed Nov. 4, 2020."

(Continued)

*Primary Examiner* — Daniel Abebe

(57) ABSTRACT

In some examples, a method is disclosed. The method includes detecting, by a smart device, an audible utterance of a trigger word. The method also includes, responsive to the detection of the audible utterance of the trigger word, recording audio via the smart device. The method also includes processing, via the smart device, the recorded audio to determine whether the recorded audio contains a command for the smart device or a different smart device to perform an action. The method also includes, responsive to determining that the recorded audio includes a command for the smart device or a different smart device to perform the action, determining whether the command is serviceable by the smart device without involvement of the different smart device. The method also includes, responsive to determining whether the command is serviceable by the smart device without involvement of the different smart device, taking action regarding the command.

12 Claims, 4 Drawing Sheets

(56) References Cited

U.S. PATENT DOCUMENTS

| | | | |
|---|---|---|---|
| 10,685,669 B1* | 6/2020 | Lan | G10L 15/1822 |
| 10,713,007 B2* | 7/2020 | Aiken | H04M 1/72415 |
| 10,958,567 B1 | 3/2021 | Tsai et al. | |
| 11,256,828 B1 | 2/2022 | Machado et al. | |
| 11,258,671 B1* | 2/2022 | Vora | G10L 15/30 |
| 11,374,781 B1 | 6/2022 | Callender et al. | |
| 11,627,011 B1 | 4/2023 | Callender et al. | |
| 2002/0181676 A1 | 12/2002 | Noblot | |
| 2010/0278127 A1 | 11/2010 | Jeon et al. | |
| 2014/0244834 A1 | 8/2014 | Guedalia et al. | |
| 2014/0355566 A1 | 12/2014 | Walley et al. | |
| 2015/0088518 A1* | 3/2015 | Kim | G10L 15/08 |
| | | | 704/251 |
| 2015/0139120 A1 | 5/2015 | ElArabawy et al. | |
| 2016/0050589 A1 | 2/2016 | Safavi | |
| 2016/0212099 A1 | 7/2016 | Zou et al. | |
| 2016/0217785 A1* | 7/2016 | Kennewick | G10L 15/24 |
| 2016/0277435 A1 | 9/2016 | Salajegheh et al. | |
| 2017/0063940 A1 | 3/2017 | Lapidous et al. | |
| 2017/0185757 A1 | 6/2017 | Yang et al. | |
| 2017/0195318 A1 | 7/2017 | Liu et al. | |
| 2018/0077067 A1 | 3/2018 | Dowlatkhah et al. | |
| 2018/0279389 A1 | 9/2018 | Kwag et al. | |
| 2018/0337958 A1 | 11/2018 | Nagarkar | |
| 2019/0014048 A1 | 1/2019 | Krishna Singuru | |
| 2019/0028338 A1 | 1/2019 | Kozura et al. | |
| 2019/0052630 A1 | 2/2019 | Lapidous et al. | |
| 2019/0052683 A1 | 2/2019 | Logue et al. | |
| 2019/0223180 A1 | 7/2019 | Fehrenbach et al. | |
| 2019/0253243 A1 | 8/2019 | Zimmerman et al. | |
| 2019/0254043 A1 | 8/2019 | Makki et al. | |
| 2019/0261243 A1 | 8/2019 | Amini et al. | |
| 2019/0279627 A1* | 9/2019 | Wang | G06F 16/632 |
| 2019/0333059 A1 | 10/2019 | Fallah et al. | |
| 2020/0112454 A1* | 4/2020 | Brown | H04L 12/2816 |
| 2020/0162287 A1 | 5/2020 | Wang | |
| 2020/0177449 A1 | 6/2020 | Dakshinyam et al. | |
| 2020/0177517 A1 | 6/2020 | Pancras et al. | |
| 2020/0280827 A1 | 9/2020 | Fechtel et al. | |
| 2020/0314247 A1 | 10/2020 | Klinger et al. | |
| 2020/0394183 A1 | 12/2020 | Jois | |
| 2020/0412810 A1 | 12/2020 | Knight et al. | |
| 2021/0049599 A1 | 2/2021 | Ghafourifar et al. | |
| 2021/0400767 A1 | 12/2021 | Zubiaur et al. | |
| 2022/0141221 A1 | 5/2022 | Callender et al. | |

OTHER PUBLICATIONS

Final Office Action dated Dec. 8, 2021, U.S. Appl. No. 17/107,590, filed Nov. 30, 2020.

Foreign Communication From a Related Counterpart Application, Invitiation to Pay Additional Fees dated Dec. 7, 2021, International Application No. PCT/US2021/048704 filed on Sep. 1, 2021.

Foreign Communication From a Related Counterpart Application, International Search Report and Written Opinion dated Jan. 25, 2022, International Application No. PCT/US2021/048704 filed on Sep. 1, 2021.

Marion, et al: "Virtualization of Home Network Gateways", Computer, IEEE, USA, vo. 47, No. 11, pp. 62-65, XP011564866, Nov. 1, 2014.

FAIPP Office Action dated Jun. 2, 2022, U.S. Appl. No. 17/089,647, filed Nov. 4, 2020.

"Restriction Requirement dated Aug. 13, 2022, U.S. Appl. No. 17/090,763, filed Nov. 5, 2020".

Callender, Christopher, et al., "Smart Device Provisioning," filed Nov. 4, 2020, U.S. Appl. No. 17/089,647.

Callender, Christopher, et al., "Smart Device Spectrum Assignment," filed Nov. 30, 2020, U.S. Appl. No. 17/107,590.

Callender, Christopher, et al., "Smart Computing Device Implementing Network Security and Data Arbitration," filed Nov. 5, 2020, U.S. Appl. No. 17/090,763.

Office Action dated Sep. 3, 2021 U.S. Appl. No. 17/107,590, filed Nov. 30, 2020, U.S. Appl. No. 17/107,590.

Al-Zihad, et al., "Bandwidth Allocation and Computation Offloading for Service Specific IoT Edge Devices", Region 10 Humanitarian Technology Conference (R10-HTC), Dec. 21, 2017.

Samie, et al., "Computation Offloading and Resource Allocation for Low-power IoT Edge Devices", 3rd World Forum on an Internet of Things, Dec. 2016, IEEE Publishing.

Callender, Christopher, et al., "Smart Computing Device Implementing Network Security and Data Arbitration," filed Sep. 1, 2021 International Application No. PCT/US2021/048704.

FAIPP Pre-Interview Communication dated Mar. 25, 2022, U.S. Appl. No. 17/089,647, filed Nov. 4, 2020.

Notice of Allowance dated Mar. 2, 2022, U.S. Appl. No. 17/107,590, filed Nov. 30, 2020.

Notice of Allowance dated Dec. 7, 2022, U.S. Appl. No. 17/089,647, filed Nov. 4, 2020.

FAIPP Pre-Interview Communication dated Sep. 29, 2022, U.S. Appl. No. 17/090,763, filed Nov. 5, 2020.

FAIPP Office Action dated Oct. 3, 2022, U.S. Appl. No. 17/090,763, filed Nov. 5, 2020.

Final Office Action dated Jan. 11, 2023, U.S. Appl. No. 17/090,763, filed Nov. 5, 2020.

Advisory Action dated Feb. 24, 2023, U.S. Appl. No. 17/090,763, filed Nov. 5, 2020.

Callender, Christopher, et al., "Smart Device Provisioning," filed Feb. 22, 2023, U.S. Appl. No. 18/172,958.

* cited by examiner

SMART COMPUTING DEVICE IMPLEMENTING ARTIFICIAL INTELLIGENCE ELECTRONIC ASSISTANT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some smart devices implement electronic assistants. The electronic assistants are constantly, or near constantly, listening to and recording audio within a listening range of the smart devices and transmitting the recorded audio to remote locations for analysis and storage, raising privacy concerns with the use, or even mere presence of, the smart devices that implement the electronic assistants.

SUMMARY

In some examples, the disclosure includes a method implemented by a smart device. In at least some examples, the method includes detecting, by the smart device, an audible utterance of a trigger word for a second smart device having a microphone muted and unable to detect the audible utterance of the trigger word. Responsive to the detection of the audible utterance of the trigger word, the method also includes recording, by the smart device, audio. The method also includes processing, by the smart device or a server associated with the smart device, the recorded audio to determine whether the recorded audio contains a command for the second smart device to perform an action. The method also includes responsive to determining that the recorded audio includes a command for the second smart device to perform the action, providing the command via an application programming interface (API) to the different smart device or a server associated with the different smart device without transmitting the recorded audio to either the smart device or the server associated with the different smart device.

In other examples, the disclosure includes a smart device. In some examples, the smart device includes a processor, a non-transitory memory coupled to the processor; and an artificial intelligence electronic assistant application stored in the non-transitory memory. When executed by the processor, the application receives audio including an audible utterance of a trigger word. When executed by the processor, the application also records audio responsive to the receipt of the audible utterance of the trigger word. When executed by the processor, the application also processes the recorded audio to determine whether the recorded audio contains a command for a different smart device to perform an action. When executed by the processor, the application also takes action responsive to determining that the recorded audio includes a command for the different smart device to perform the action.

In other examples, the disclosure includes a method. In at least some examples, the method includes detecting, by a smart device, an audible utterance of a trigger word. The method also includes, responsive to the detection of the audible utterance of the trigger word, recording audio via the smart device. The method also includes processing, via the smart device, the recorded audio to determine whether the recorded audio contains a command for the smart device or a different smart device to perform an action. The method also includes responsive to determining that the recorded audio includes a command for the smart device or a different smart device to perform the action, determining whether the command is serviceable by the smart device without involvement of the different smart device. The method also includes, responsive to determining whether the command is serviceable by the smart device without involvement of the different smart device, taking action regarding the command.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
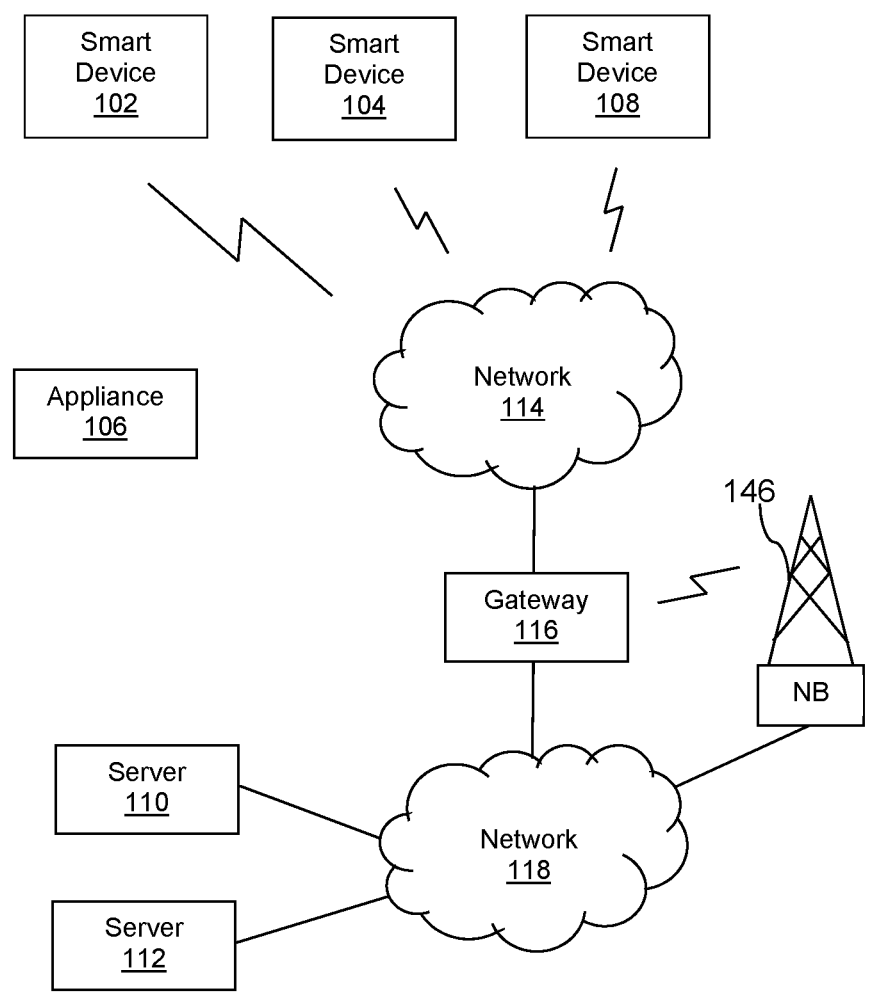
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Smart home devices continue to become more prevalent and ingrained in the daily lives of users. Some of the smart home devices include electronic assistants that monitor audio to detect commands from a user. For example, at least some electronic assistants record, store, and process audio locally, while other electronic assistants record, transmit, store, and process at least partially remotely, such as at a remote server. While some of the audio recorded and stored by the electronic assistants is relevant to operation of the electronic assistants, such as trigger words, commands, etc., much of the audio may be unrelated to operation of the electronic assistants. Some of this audio can include background conversations between occupants of a location within audio range of the electronic assistants. Some of these background conversations can include confidential communications that the occupants do not wish to be recorded, stored, or analyzed. To protect these confidential communications, many electronic assistants are equipped with a mute functionality that mutes a microphone of the electronic assistant so that audio is not monitored when the mute function is enabled. However, when the electronic assistant is unable to receive audio commands, much of the electronic assistant's functionality becomes unavailable to a user, frustrating the purpose of the electronic assistant. Thus, an untenable trade-off between competing interests of privacy and device functionality exists.

Furthermore, as these smart home devices become more prevalent, more and more vendors enter the market and begin offering their own devices. Not all of these devices communicate using a same communication protocol or operate according to a same command or instruction set. Thus, it is entirely possible for a single location to have smart home devices from multiple vendors that are not interoperable with one another. For example, in a residence a first light is controllable by a first electronic assistant and a second light is controllable by a second electronic assistant, however the first light is not controllable by the second electronic assistant and the second light is not controllable by the first electronic assistant. Additionally, the first electronic assistant and the second electronic assistant are generally not interoperable, resulting in multiple independent electronic assistants operating in the same location at the same time. This can degrade a user experience when using the first and second electronic assistants because the electronic assistant capable of controlling a particular light may be out of range for detecting commands to control the light, thus failing to respond to a user's command. Some approaches exist for providing interoperability between these smart home devices. For example, smart home hubs can communicate between separate communication protocols. However, these devices, too, are limited in functionality and suffer from similar privacy concerns as described above.

Aspects of the present disclosure provide for a system that interfaces between smart home devices. The system can, in some examples, receive and locally process audio to determine which electronic assistant is suitable or appropriate for servicing a particular user command or request. In other examples, the audio may be processed in a remote, but secure, location, such as a server associated with the system. After determining a suitable electronic assistant, the system passes the user command to the suitable electronic assistant. In some examples, the command is passed as a digital file that includes one or more characters derived from the audio detected by the system but does not include the audio recording itself. The command may be passed, in some examples, according to an application programming interface (API) of the electronic assistant, or a backend server associated with the electronic assistant. In other examples, the system provides an audio recording including the command to the suitable electronic assistant or a backend server associated with the electronic assistant. The audio recording including the command may be a portion, but not all, of the audio received by the system. For example, the system may remove audio extraneous to the command before providing the audio recording including the command. In at least some examples, the audio recording including the command is provided to the suitable electronic assistant or a backend server associated with the electronic assistant, via an API. This functionality enables an electronic assistant to receive commands via the system even if a microphone of the electronic assistant is muted. Thus, the system facilitates balancing or reconciling of the competing interests of both privacy, by enabling the microphone of the electronic assistant to be muted, and functionality, by enabling the electronic assistant to receive commands and operate despite the microphone of the electronic assistant being muted.

In some examples of the system, levels or tiers of security may be defined for the received audio. For example, some implementations of the system may have at least four tiers of security available for received audio. At a first tier, the system may prevent the received audio from being transmitted outside of a home or other location in which the system exists. For example, the system may receive the audio, process the audio locally, and provide only a command identified in the received audio to an electronic assistant, or a server associated with the electronic assistant, for servicing. At the first tier, the electronic assistant, or the server associated with the electronic assistant, does not receive any audio file from the system (e.g., does not receive the raw, or received, audio from the system, or a portion of the received audio that includes the command).

At a second tier, the system may again prevent the received audio from being transmitted outside of control of the system. For example, the system may receive the audio, process the audio remotely in a secure and controlled environment (e.g., such as via a server associated with the system and being limited to only processing audio received from the system), and provide only a command identified in the received audio to an electronic assistant, or a server associated with the electronic assistant, for servicing. The command may be provided to the electronic assistant, or the server associated with the electronic assistant, directly by the server that processes the audio received from the system, or the command may be returned to the system which may then provide the command to the electronic assistant, or the server associated with the electronic assistant. Again at this second tier, the electronic assistant, or the server associated with the electronic assistant, does not receive any audio file from the system (e.g., does not receive the raw, or received, audio from the system, or a portion of the received audio that includes the command).

At a third tier, the system may again prevent the received audio from being transmitted outside of control of the system. For example, the system may receive the audio, process the audio remotely via a server associated with the system (e.g., and not associated with the electronic assistant) but not being limited purpose as in the second tier. A command identified in the received audio may be provided to an electronic assistant, or a server associated with the electronic assistant, for servicing. The command may be provided to the electronic assistant, or the server associated with the electronic assistant, directly by the server that processes the audio received from the system, or the command may be returned to the system which may then provide the command to the electronic assistant, or the server associated with the electronic assistant. Again at this third tier, the electronic assistant, or the server associated with the electronic assistant, does not receive any audio file from the system (e.g., does not receive the raw, or received, audio from the system, or a portion of the received audio that includes the command).

At a fourth tier, the system may prevent portions of received audio extraneous to a command identified in the received audio from being transmitted outside of control of the system. For example, the system may receive the audio, process the audio locally or remotely via a server associated with the system (e.g., and not associated with the electronic assistant). A command may be identified in the received audio and a portion of the received audio including the command, but excluding at least some audio extraneous to the command, may be provided to an electronic assistant, or a server associated with the electronic assistant, for servicing. The audio including the command may be provided to the electronic assistant, or the server associated with the electronic assistant, directly by the server that processes the audio received from the system, or the audio including the command may be returned to the system which may then provide the audio including the command to the electronic assistant, or the server associated with the electronic assistant. At this fourth tier, the electronic assistant, or the server associated with the electronic assistant, receives an audio file including the command, but excluding components of received or recorded audio that are extraneous to the command.

In an operational example, a first vendor may offer an electronic assistant colloquially known as "Jane" and a second vendor may offer an electronic assistant colloquially known as "Sam." Jane has access to a first set of functions and Sam has access to a second set of functions, some, but not all, of which may overlap with the first set of functions. Jane and Sam can activate based on commands addressed to them by name, such that their names are triggers for the respective electronic assistants to take action. However, this requires microphones of Jane and Sam to remain active and listening to audio to detect their names and any subsequent commands. This also requires a user to know what capability, functionality, or device control is available via Jane and what capability, functionality, or device control is available via Sam and to address commands to the correct one of Jane or Sam. The system of this disclosure introduces an artificial intelligence overlay that operates as an electronic assistant that facilitates interoperability between Jane and Sam. For purposes of discussion, this artificial intelligence overlay that operates as an electronic assistant will be referred to as "Max." Thus, the system of this disclosure enables a user to address commands or requests to Max. Max will then operate as an arbiter, determining whether the command is appropriate for Jane or for Sam and passing the command to the appropriate electronic assistant for servicing. Alternatively, in some examples Max passes or transmits the command to a network-side server functionality associated with Jane or Sam, as determined to be appropriate by Max, bypassing the audio capture and/or processing by the systems of Jane or Sam. Additionally, Jane or Sam may not be required. For example, the command might be a command for turning on or off an appliance that has smart device (e.g., Internet of things (IoT)) functionality. In such an example, Max may transmit a command to the appliance, bypassing both Jane and Sam despite at least one of Jane or Sam also having a capability to pass commands to the appliance.

The system of this disclosure is not limited to only interaction with smart device appliances or electronic assistants. In at least some examples, the system includes functionality suitable for communicating or interacting with other software or hardware systems or processes. For example, the system may interact with an audio and/or video communication system to initiate or accept establishment of a communication session with other parties. In at least some examples, the system maintains a language repository or database such that the system is capable of processing or analyzing multiple languages based on content of the language repository. Further, when the system is trained with voice data from a plurality of users, in at least some examples the system maintains a voice repository or database that enables the system to identify from which user audio has been received and, in some examples, take action or modify processing of the audio based on the user from which the audio was received.

Turning now to FIG. 1, a block diagram of an illustrative system 100 is described. In at least one example, the system 100 includes a smart device 102, a smart device 104, an appliance 106, a smart device 108, a server 110, a server 112, a network 114, a gateway 116, and a network 118. In at least some examples, the smart device 102, the smart device 104, the appliance 106, and the smart device 108 are located in a first location such as a house, an office building, etc. and are communicatively coupled together via the network 114. The network 114 is, in some examples, communicatively coupled to the network 118 via the gateway 116. The server 110 is, in some examples, associated with the smart device 102 and is communicatively coupled to the smart device 102 via the network 114, gateway 116, and network 118. The server 112 is, in some examples, associated with the smart device 104 and is communicatively coupled to the smart device 104 via the network 114, gateway 116, and network 118.

At least some implementations of the smart device 102 implement an electronic assistant, referred to herein as Jane, which communicates with the server 110 to provide the electronic assistance functionality. Additionally, at least some implementations of the smart device 104 implement an electronic assistant, referred to herein as Sam, which communicates with the server 112 to provide the electronic assistance functionality. Further, at least some implementations of the smart device 108 implement an artificial intelligence overlay that operates as an electronic assistant referred to herein as Max. In some examples, the smart device 108 is a purpose-built device. In other examples, the smart device 108 is implemented as an executable on any device having suitable processing capacity, such as a desktop computer, a server computer, a laptop computer, processor in an automobile or other transportation vehicle, a television, a phone, a wearable device, an IoT device, etc. By implementing the artificial intelligence overlay on one of the above computing devices, such computing device becomes a smart device (e.g., the smart device 108).

The appliance 106 is any device having smart, or IoT, functionality such that it is controllable by at least one of Jane, Sam, or some other smart controller (not shown) and is also controllable by Max. For example, various implementations of the appliance 106 include a smart light switch, a smart television, a smart audio system, a smart thermostat device or other climate control device, smart refrigerator, a smart coffee maker or other consumer device, etc. The network 114 is, in some examples, a local area network. For example, in some implementations the network 114 is a home network provided by one or more access points and operating according to conventional wireless technologies such as via a Bluetooth® interface or an IEEE 802.11 compliant wireless interface. The network 118 is, in some examples, a wide area network. For example, the network 118 is a network or a communications service provider and is communicatively coupled to the gateway 116 via a wired or wireless distribution network. For example, the network 118 may be communicatively coupled to the gateway 116 via wired cables such as copper-based cables or fiber-optic cables. Alternatively, the network 118 may be communicatively coupled to the gateway 116 via wireless protocol(s) implemented via radio transceiver cards that promote radio communications using protocols such as code division multiple access (CDMA), global system for mobile communications (GSM), long-term evolution (LTE), worldwide interoperability for microwave access (WiMAX), and/or other air interface protocol(s).

The gateway 116 is any device suitable for facilitating communication between the network 114 and the network 118. Accordingly, in some examples, the gateway 116 is a router. While the gateway 116 illustrated as having a hardwired connection to the network 118, in some examples such a connection does not exist. Instead, in such examples the gateway 116 is communicatively coupled to the network 118 via a Node B (NB) 146. The NB 146 may be an enhanced NB (eNB) used in long term evolution (LTE) communications, a gigabit NB (gNB) used in 5G communications of 5G New Radio communications, or any other access node according to any suitable radio access technology to communicatively couple the gateway 116, wirelessly, to the network 118. In such examples, the gateway 116 may be a mobile hotspot that communicates with the network 118 via the NB 146 and is coupled to the network 114. In yet other examples, the gateway 116 also includes wireless router functionality such that the gateway 116 generates or creates the network 116. Further, in at least some examples, and although illustrated separately in FIG. 1, the smart device 108 and the gateway 116 are co-located in a same device. For example, the gateway 116 may be a mobile hotspot that enables a device, communicatively coupled wirelessly or via a wired connection to the gateway 116, to be communicatively coupled to the NB 146 and network 118 and also has processing capability. That processing capability of the gateway 116 may implement the artificial intelligence overlay (e.g., an artificial intelligence software application) that operates as the electronic assistant Max, as discussed elsewhere herein.

To interact with Jane, in at least some examples, a user within communications range of the smart device 102 verbally addresses Jane, along with providing a query or command to Jane. The communications range is, in some examples, an effective range of a microphone (not shown) of the smart device 102, where the maximum communications range is a maximum physical distance from the smart device 102 at which the smart device 102 can detect and capture audio. Thus, in at least some implementations, the microphone of the smart device 102 is monitoring for audio in an ongoing or continuous manner to detect a user addressing a statement to Jane. As discussed above, this can raise privacy concerns for some users and discourage deployment of the smart device 102 by at least some of these users. To address this concern, the smart device 102 may include a mute or other control that prevents the microphone of the smart device 102 from monitoring for audio. However, at least some functionality of the smart device 102 may be limited or wholly prevented by muting the microphone of the smart device 102, thus discouraging at least some users from utilizing the mute functionality of the smart device 102.

When a user addresses a statement to Jane, in at least some examples an audio file including the statement is recorded by the smart device 102 and is transmitted to the server 110. The server 110 processes and analyzes the audio file to determine whether the statement includes a command or query which is serviceable by Jane. When the statement includes a command or query serviceable by Jane, the server 110 returns data to the smart device 102 that includes information to provide to the user or a command for the smart device 102 to execute. In some examples, the smart device 102 can provide the information to the user audibly via a speaker (not shown) of the smart device 102 and/or visually via a visual indicator (not shown) of the smart device 102. Further, in some examples the smart device 102 executes a command received from the server 110 to interact with (e.g., control, write information to, or query information from) the appliance 106 based on the statement recorded by the smart device 102.

In other examples, when a user addresses a statement to Jane an audio file including the statement is recorded by the smart device 102. The smart device 102 processes and analyzes the audio file to determine whether the statement includes a command or query which is serviceable by Jane. When the statement includes a command or query serviceable by Jane, the smart device 102 interacts with the server 110 via an API of the server 110 to service the command or query. For example, the smart device 102 may interact with the server 110 to determine an action to perform or information to return responsive to the command or query. In at least some examples, the server 110 returns data to the smart device 102 that includes information to provide to the user or a command for the smart device 102 to execute. In some examples, the smart device 102 can provide the information to the user audibly via a speaker (not shown) of the smart device 102 and/or visually via a visual indicator (not shown) of the smart device 102. Further, in some examples the smart device 102 executes a command received from the server 110 to interact with (e.g., control, write information to, or query information from) the appliance 106 based on the statement recorded by the smart device 102. In other examples, the smart device 102 determines and executes the command based on the audio file without interacting with the server 110.

Similarly, to interact with Sam, in at least some examples, a user within communications range of the smart device 104 verbally addresses Sam, along with providing a query or command to Sam. The communications range is, in some examples, an effective range of a microphone (not shown) of the smart device 104, where the maximum communications range is a maximum physical distance from the smart device 104 at which the smart device 104 can detect and capture audio. Thus, in at least some implementations, the microphone of the smart device 104 is monitoring for audio in an ongoing or continuous manner to detect a user addressing a statement to Sam. As discussed above, this can raise privacy concerns for some users and discourage deployment of the smart device 104 by at least some of these users. To address this concern, the smart device 104 may include a mute or other control that prevents the microphone of the smart device 104 from monitoring for audio. However, at least some functionality of the smart device 104 may be limited or wholly prevented by muting the microphone of the smart device 104, thus discouraging at least some users from utilizing the mute functionality of the smart device 104.

When a user addresses a statement to Sam, in at least some examples an audio file including the statement is recorded by the smart device 104 and is transmitted to the server 112. The server 112 processes and analyzes the audio file to determine whether the statement includes a command or query which is serviceable by Sam. When the statement includes a command or query serviceable by Sam, the server 112 returns data to the smart device 104 that includes information to provide to the user or a command for the smart device 104 to execute. In some examples, the smart device 104 can provide the information to the user audibly via a speaker (not shown) of the smart device 104 and/or visually via a visual indicator (not shown) of the smart device 104. Further, in some examples the smart device 104 executes a command received from the server 112 to interact with (e.g., control, write information to, or query information from) the appliance 106 (or another appliance that is not shown) based on the statement recorded by the smart device 104.

In other examples, when a user addresses a statement to Sam an audio file including the statement is recorded by the smart device 104. The smart device 104 processes and analyzes the audio file to determine whether the statement includes a command or query which is serviceable by Sam. When the statement includes a command or query serviceable by Sam, the smart device 104 interacts with the server 112 via an API of the server 112 to service the command or query. For example, the smart device 104 may interact with the server 112 to determine an action to perform or information to return responsive to the command or query. In at least some examples, the server 112 returns data to the smart device 104 that includes information to provide to the user or a command for the smart device 104 to execute. In some examples, the smart device 104 can provide the information to the user audibly via a speaker (not shown) of the smart device 104 and/or visually via a visual indicator (not shown) of the smart device 104. Further, in some examples the smart device 104 executes a command received from the server 112 to interact with (e.g., control, write information to, or query information from) the appliance 106 (or another appliance that is not shown) based on the statement recorded by the smart device 104. In other examples, the smart device 104 determines and executes the command based on the audio file without interacting with the server 112.

The smart device 108, in some examples, augments or aids in operation of the smart device 102 and/or the smart device 104. For example, if a user is out of range of a microphone of the smart device 102 or the smart device 104 and the user attempts to interact with the smart device 102 or the smart device 104 by addressing a statement to Jane or Sam, respectively, the smart device 102 or the smart device 104 will not respond. However, if a microphone of the smart device 108 is within range of the user and detects the user addressing Jane or Sam, the smart device 108 may forward a request of the user to the smart device 102 or 104. The smart device 108 may forward the request in various ways.

In one example, the smart device 108 records an audio file including a statement addressed by the user to Jane or Sam and transmits the audio file via the network 114. Processing of the audio file then proceeds as if the smart device 102 or the smart device 104 had recorded the audio file. When the smart device 102 or the smart device 104 generates feedback, responsive to the audio file, for providing to the user, in some examples, the smart device 102 or the smart device 104 transmits that feedback to the smart device 108 via the network 114 for presentation to the user by the smart device 108. Responsive to receipt of the feedback, in at least some examples, the smart device 108 provides the feedback to the user, such as via a visible indicator or display (not shown) or speaker of the smart device 108.

In another example, the smart device 108 records the audio file and then processes and analyzes the audio file to determine whether the statement includes a command or query which is serviceable by Jane or Sam. When a serviceable command or query is detected in the audio file the smart device 108 transmits the command or query to the smart device 102 or the smart device 104, as appropriate. In some examples, the smart device 108 subsequently receives feedback for presenting to the user based on the command or query, as discussed above, and provides that feedback to the user.

The smart device 108, in other examples, supplants or replaces operation of at least some functions of the smart device 102 and/or the smart device 104. For example, microphones of the smart device 102 and the smart device 104 may be muted such that the smart device 102 and the smart device 104 are each prevented from detecting or recording audio. In this manner, privacy is enhanced in the presence of the smart device 102 and the smart device 104. However, as discussed above, functionality of the smart device 102 and the smart device 104 is reduced when the smart device 102 and the smart device 104 are prevented from recording audio. To facilitate the enhanced privacy while also maintaining at least some functionality of the smart device 102 and/or the smart device 104, in some examples the smart device 108 monitors for statements addressed to Jane, Sam, or Max. On detection of a spoken keyword or trigger, such as "Jane," "Sam," or "Max," the smart device 108 begins recording audio until an end of audio is detected. The smart device 108 then processes the recorded audio on-device, for example, without transmitting the audio off of the smart device 108 to a server or other remote location. The local processing of the recorded audio, in at least some examples, enhances privacy afforded to user of the smart device 108 by the smart device 108.

Based on the processing, the smart device 108 may take one or more actions. In some examples, the smart device 108 may determine that the recorded audio did not include an actionable command or request and may therefore take no further action with respect to the recorded audio. In other examples, the smart device 108 may determine that the recorded audio includes a serviceable command or request. The serviceable command or request may be serviceable by the smart device 102, the smart device 104, and/or the smart device 108. When the smart device 108 is capable of servicing the command or request, in at least some examples the smart device 108 services the command or request without interacting with the smart device 102 or the smart device 104. In some examples, servicing the request includes interacting with the appliance 106, querying information from one or more sensors (not shown), querying information from, or otherwise interacting with, one or more databases or data repositories (including the Internet), initiating one or more services (such electronic message messaging, voice calling, audio calling, etc.), or interacting with a remote service (e.g., placing an order, making a reservation, etc.). In some examples, the smart device 108 communicates with a remote server to determine what actions to take to service the command. The smart device 108 may do so without transmitting the recorded audio to the remote server, such as by only transmitting the identified command or request to the remote server.

In other examples, the command or request identified by the smart device 108 may not be serviceable by the smart device 108 but may be serviceable by the smart device 102 or the smart device 104. In such examples, the smart device 108 may transmit data to one of the smart device 102 or the smart device 104 to cause the serviceable command or request to be serviced. The data may be, for example, the command or request, or an identifier indicative of the command or request, passed to the smart device 102 or the smart device 104 via an API of the smart device 102 or the smart device 104. In at least some examples, privacy is enhanced by the smart device 108 not providing the recorded audio, or extraneous data unrelated to or unnecessary for, servicing the command or request to the smart device 102 or the smart device 104. In other examples, the smart device 108 transmits data to one of the server 110 or the server 112 to cause the serviceable command or request to be serviced at least partially by the server 110 or the server 112, respectively.

In at least some examples, to provide the command to the smart device 102 or the smart device 104 (or to the server 110 or the server 112, respectively) the smart device 108 translates the detected command into an instruction, identifier, or other data form or structure that is supported by a device with which the smart device 108 is communicating. For example, while the smart device 108 detects a command for a device controllable by the smart device 102, the command itself may not be in a format understandable by software of, or associated with, the smart device 102. In such an example, the smart device 108 may translate the command to something that is understandable by the smart device 102, such as by querying a look-up table (stored locally or remotely) or other database, prior to transmitting the command to the smart device 102.

In at least some implementations, each time the smart device 108 records and processes audio, the smart device 108 records at least some of its actions as a blockchain element (e.g., a blockchain block, or more simply, a block) in a blockchain stored locally by the smart device 108. Based on this blockchain, in at least some examples, the smart device 108 can learn from previous actions and refer back to certain blocks or chains (e.g., groups or sequences of blocks) of the blockchain. In at least some examples, the smart device 108 further implements machine learning algorithms or processing to learn from past actions and processing to more efficiently perform future processing. The more efficient processing may be, for example, facilitating the omission of steps to more rapidly obtain a result or come to a conclusion or completion of processing.

It is understood that while the smart devices are shown and described (e.g., the smart device 102 and the smart device 104), any number of smart devices may exist in the system 100. Similarly, while only a single appliance 106 is shown and described, any number of appliances may exist in the system 100. Further, while the servers 110 and 112 are shown and described, any number of servers may exist in the system 100. Servers, or server computers, are discussed in more detail hereinafter.

Figure 2:
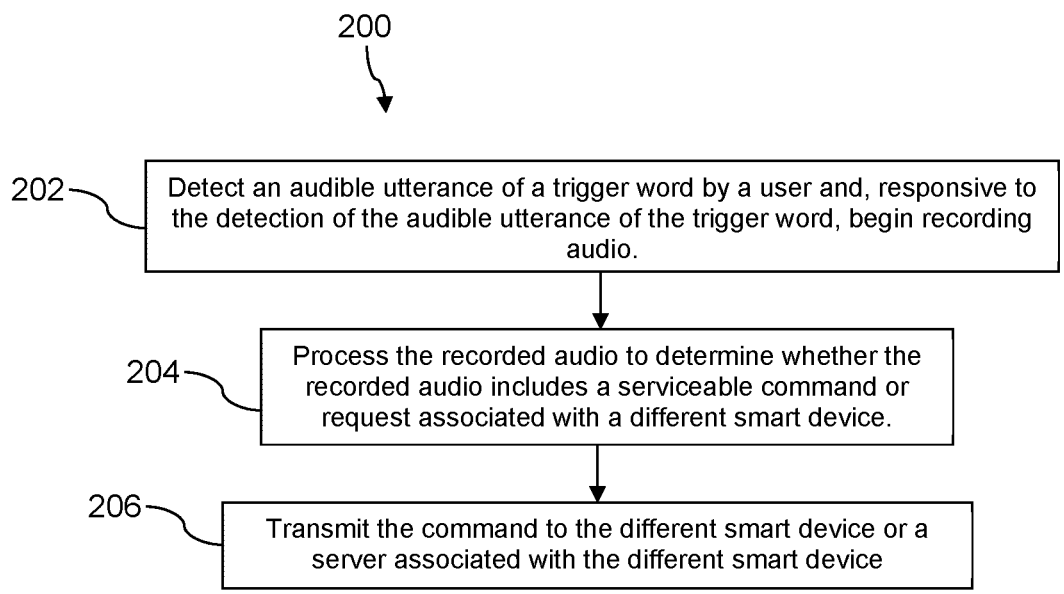
FIG. 2 is a flow chart of an illustrative method according to an embodiment of the disclosure.

Turning now to FIG. 2, a flowchart of an illustrative method 200 is described. In at least some examples, the method 200 is implemented as, or as a component of, an artificial intelligence overlap implemented on a computing device to convert the computing device into a specific and particular machine, such as a smart device having electronic assistance functionality. The smart device is, in some examples, the smart device 108 of the system 100 of FIG. 1.

At operation 202, the smart device detects an audible utterance of a trigger word by a user and, responsive to the detection of the audible utterance of the trigger word, begins recording audio. The trigger word is, in some examples, a trigger word for the smart device. In other examples, the trigger word is a trigger word for a different smart device that, in some examples, is not within audible monitoring range of the user. The recording continues, in at least some examples, until a condition for stopping recording is met. The condition may be, in some examples, the detection of an audible utterance of another trigger word. In other examples, the condition is passage of a predetermined period of time without detecting additional audio, such as at the conclusion of a sentence. In yet other examples, the condition is the detection of a command or request in the recorded audio such that further recording would be extraneous to the command or request.

At operation 204, the smart device processes the recorded audio to determine whether the recorded audio includes a valid and serviceable command or request associated with the different smart device. When the recorded audio does not include a serviceable command or request, the smart device discards the recorded audio. When the recorded audio includes a serviceable command or request, serviceable by the different smart device, the smart device determines an electronic command or instruction corresponding to the command of the recorded audio and compatible with the different smart device. For example, while the command determined by the smart device may relate to an action performable by the different smart device, the command determined from the recorded audio by the smart device may not be in a syntax or format understandable by the different smart device. In such an example, the smart device translated the determined command into a format or syntax compatible with the different smart device. In some examples, the processing includes filtering the recorded audio to generate clean audio that includes the command while at least partially suppressing the presence of background noise or audible utterances other than the command in the clean audio.

At operation 206, the smart device transmits the command to the different smart device or to a server associated with the different smart device. In some examples, transmitting the command includes transmitting the clean audio to the different smart device or to a server associated with the different smart device. In other examples, transmitting the command includes transmitting an electronic indication of the command, without transmitting the recorded audio or the clean audio, to the different smart device or to a server associated with the different smart device. In at least some examples, privacy is enhanced by the smart device preventing the different smart device from receiving recorded audio or other user-derived information extraneous to the command.

Figure 3:
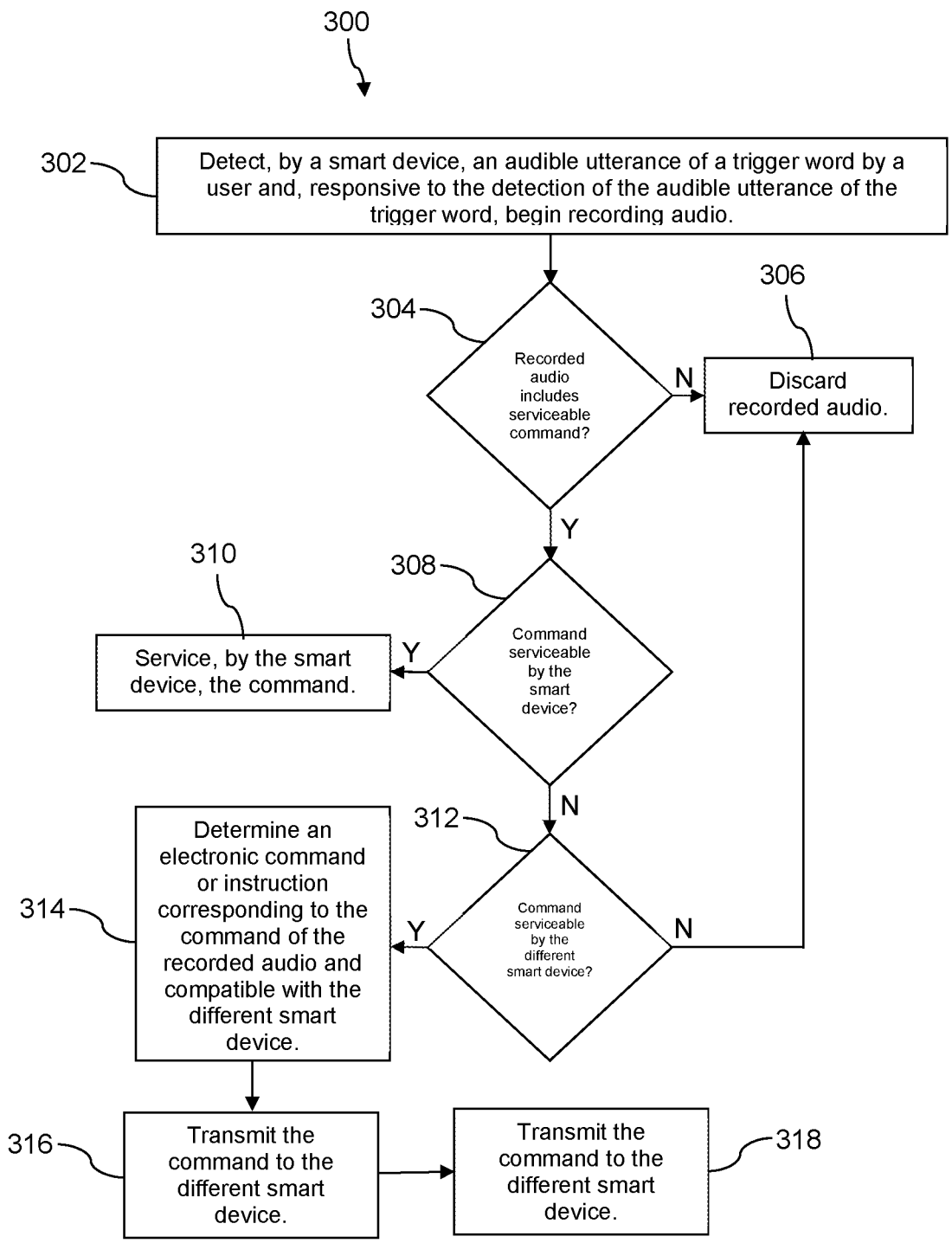
FIG. 3 is a flow chart of an illustrative method according to an embodiment of the disclosure.

Turning now to FIG. 3, a flowchart of an illustrative method 300 is described. In at least some examples, the method 300 is implemented as, or as a component of, an artificial intelligence overlap implemented on a computing device to convert the computing device into a specific and particular machine, such as a smart device having electronic assistance functionality. The smart device is, in some examples, the smart device 108 of the system 100 of FIG. 1.

At operation 302, the smart device detects an audible utterance of a trigger word by a user and, responsive to the detection of the audible utterance of the trigger word, begins recording audio. The trigger word is, in some examples, a trigger word for the smart device. In other examples, the trigger word is a trigger word for a different smart device. The recording continues, in at least some examples, until a condition for stopping recording is met. The condition may be, in some examples, the detection of an audible utterance of another trigger word. In other examples, the condition is passage of a predetermined period of time without detecting additional audio, such as at the conclusion of a sentence. In yet other examples, the condition is the detection of a command or request in the recorded audio such that further recording would be extraneous to the command or request.

At operation 304, the smart device processes the recorded audio to determine whether the recorded audio includes a valid and serviceable command or request. The command or request may be associated with (e.g., serviceable by) the smart device or may not be associated with the smart device but may be associated with the different smart device. When the recorded audio does not include a serviceable command or request, the smart device proceeds to operation 306 and discards the recorded audio. When the recorded audio includes a serviceable command or request, the smart device proceeds to operation 308.

At operation 308, the smart device determines whether the command or request is serviceable by the smart device without involvement of the different smart device. When the command or request is serviceable by the smart device without involvement of the different smart device, the smart device proceeds to operation 310. At operation 310, the smart device services the command or request received in the audio recorded at operation 302. The smart device services the command or request by controlling at least one electronic device, such as an appliance or an output device of the smart device, to perform an action or provide an output responsive to the command or request. Returning to operation 308, when the command or request is not serviceable by the smart device, the smart device proceeds to operation 312.

At operation 312, the smart device determines whether the command or request is serviceable by the different smart device. When the command or request is serviceable by the different smart device, the smart device proceeds to operation 314. When the command is not serviceable by the different smart device, the smart device proceeds to operation 306.

At operation 314, the smart device determines an electronic command or instruction corresponding to the command of the recorded audio and compatible with the different smart device. For example, while the command determined by the smart device may relate to an action performable by the different smart device, the command determined from the recorded audio by the smart device may not be in a syntax or format understandable by the different smart device. In such an example, the smart device translates the determined command into a format or syntax compatible with the different smart device. In some examples, the processing includes filtering the recorded audio to generate clean audio that includes the command while at least partially suppressing the presence of background noise or audible utterances other than the command in the clean audio.

At operation 316, the smart device transmits the command to the different smart device or to a server associated with the different smart device. In some examples, transmitting the command includes transmitting the clean audio to the different smart device or to a server associated with the different smart device. In other examples, transmitting the command includes transmitting an electronic indication of the command, without transmitting the recorded audio or the clean audio, to the different smart device or to a server associated with the different smart device. In at least some examples, privacy is enhanced by the smart device preventing the different smart device from receiving recorded audio or other user-derived information extraneous to the command.

At operation 318, based on the command received from the smart device, the different smart device or the server associated with the different smart device controls at least one electronic device, such as an appliance or an output device of the different smart device, to service the command received from the smart device.

Figure 4:
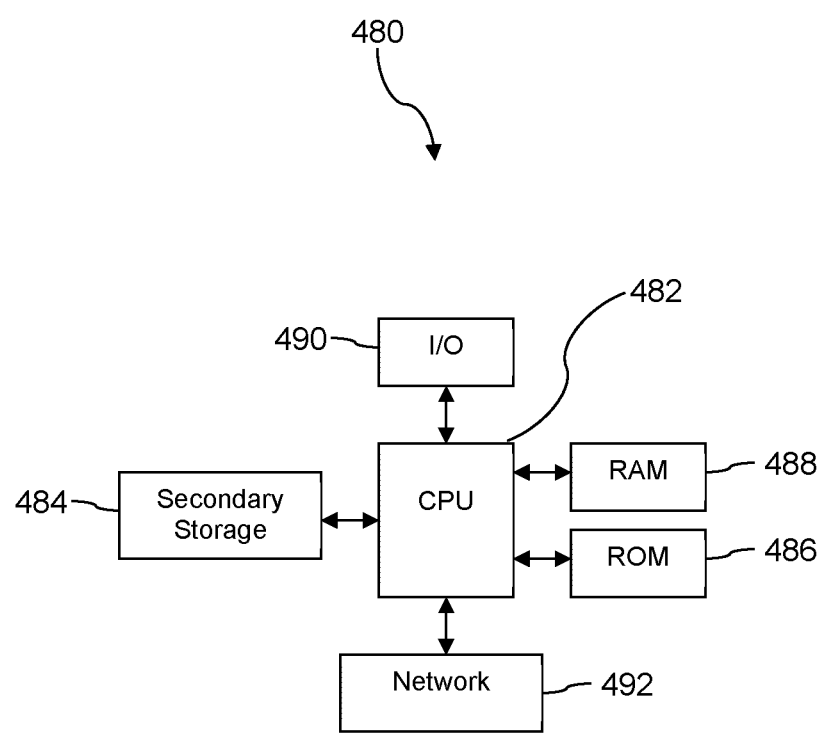
FIG. 4 is block diagram of an illustrative computer system according to an embodiment of the disclosure.

FIG. 4 illustrates a computer system 480 suitable for implementing one or more embodiments disclosed herein. The computer system 480 includes a processor 482 (which may be referred to as a central processor unit (CPU)) that is in communication with memory devices including secondary storage 484, read only memory (ROM) 486, random access memory (RAM) 488, input/output (I/O) devices 490, and network connectivity devices 492. The processor 482 may be implemented as one or more CPU chips. In at least some examples, the smart device 102, the smart device 104, the smart device 108, the server 110, and/or the server 112 are implemented according to an architecture including at least the system 480.

It is understood that by programming and/or loading executable instructions onto the computer system 480, at least one of the processor 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 480 is turned on or booted, the processor 482 may execute a computer program or application. For example, the processor 482 may execute software or firmware stored in the ROM 486 or stored in the RAM 488. In some cases, on boot and/or when the application is initiated, the processor 482 may copy the application or portions of the application from the secondary storage 484 to the RAM 488 or to memory space within the processor 482 itself, and the processor 482 may then execute instructions that the application is comprised of. In some cases, the processor 482 may copy the application or portions of the application from memory accessed via the network connectivity devices 492 or via the I/O devices 490 to the RAM 488 or to memory space within the processor 482, and the processor 482 may then execute instructions that the application is comprised of. During execution, an application may load instructions into the processor 482, for example load some of the instructions of the application into a cache of the processor 482. In some contexts, an application that is executed may be said to configure the processor 482 to do something, e.g., to configure the processor 482 to perform the function or functions promoted by the subject application. When the processor 482 is configured in this way by the application, the processor 482 becomes a specific purpose computer or a specific purpose machine.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 492 may provide wired communication links and/or wireless communication links (e.g., a first network connectivity device 492 may provide a wired communication link and a second network connectivity device 492 may provide a wireless communication link). Wired communication links may be provided in accordance with Ethernet (IEEE 802.4), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), flash drive, ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer system 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented by a smart device, comprising:
    detecting, by the smart device, an audible utterance of a trigger word for a different smart device having a microphone muted and unable to detect the audible utterance of the trigger word;
    responsive to the detection of the audible utterance of the trigger word, recording, by the smart device, audio;
    processing, by the smart device or a server associated with the smart device, the recorded audio to determine whether the recorded audio contains a command for the different smart device to perform an action, wherein processing the recorded audio includes:
        analyzing the recorded audio to identify the command, wherein the command corresponds to an action performable by the different smart device but the command is in a format incompatible with the different smart device; and
        determining an indication of the command, wherein the indication of the command is in a format compatible with the different smart device; and
    responsive to determining that the recorded audio includes the command for the different smart device to perform the action, providing the command via an application programming interface (API) to the different smart device or a server associated with the different smart device without transmitting the recorded audio to either the different smart device or the server associated with the different smart device.

2. The method of claim 1, wherein processing the recorded audio includes performing an audio analysis to generate a textual representation of the recorded audio, the textual representation including at least the command for the different smart device to perform the action.

3. The method of claim 2, wherein transmitting the command to the different smart device or a server associated with the different smart device comprises transmitting the textual representation of the command for the different smart device to perform the action to the different smart device or the server associated with the different smart device without also transmitting the recorded audio.

4. The method of claim 1, wherein transmitting the command to the different smart device or a server associated with the different smart device comprises transmitting the indication of the command to the different smart device or the server associated with the different smart device without also transmitting the recorded audio.

5. A smart device, comprising:
    a processor;
    a non-transitory memory coupled to the processor; and
    an artificial intelligence electronic assistant application stored in the non-transitory memory that, when executed by the processor:
        receives audio including an audible utterance of a trigger word;
        responsive to the receipt of the audible utterance of the trigger word, records audio;
        processes the recorded audio to determine that the recorded audio contains a command for a different smart device to perform an action, wherein the processing comprises:
            analyzing the recorded audio to identify the command, wherein the command corresponds to an action performable by the different smart device but the command is in a format incompatible with the different smart device; and
            determining an indication of the command, wherein the indication of the command is in a format compatible with the different smart device; and
        provides the command to the different smart device or a server associated with the different smart device without transmitting the recorded audio to either the different smart device or the server associated with the different smart device.

6. The smart device of claim 5, wherein the command is transmitted as clean audio that is generated by filtering the recorded audio to remove background noise and extraneous sounds unrelated to the command from the recorded audio to generate the clean audio.

7. The smart device of claim 5, wherein the command is transmitted as an identifier of the command without also transmitting the recorded audio.

8. The smart device of claim 5, wherein the command is transmitted to the different smart device while a microphone of the different smart device is muted rendering the different smart device incapable of recording audio.

9. A method, comprising:
  detecting, by a smart device, an audible utterance of a trigger word;
  responsive to the detection of the audible utterance of the trigger word, recording audio via the smart device;
  processing, via the smart device, the recorded audio to determine whether the recorded audio contains a command for the smart device or a different smart device to perform an action;
  responsive to determining that the recorded audio includes the command for the smart device or the different smart device to perform the action, determining whether the command is serviceable by the smart device without involvement of the different smart device; and
  responsive to determining that the command is not serviceable by the smart device without involvement of the different smart device:
    identifying, by the smart device, the command based on analyzing the recorded audio, wherein the command corresponds to an action performable by the different smart device but the command is in a format incompatible with the different smart device;
    determining, by the smart device, an indication of the command, wherein the indication of the command is in a format compatible with the different smart device; and
    transmitting the command including at least the indication of the command to the different smart device or a server associated with the different smart device.

10. The method of claim 9, wherein the command is transmitted as an identifier of the command without also transmitting the recorded audio.

11. The method of claim 9, wherein a microphone of the different smart device is muted, preventing the different smart device from recording audio.

12. The method of claim 9, further comprising erasing, via the smart device, the recorded audio after processing the recorded audio to determine whether the recorded audio contains the command for the smart device or the different smart device to perform the action.

* * * * *